(12) United States Patent
Vetter et al.

(10) Patent No.: US 11,841,101 B2
(45) Date of Patent: Dec. 12, 2023

(54) HOSE CLAMP

(71) Applicant: Oetiker Schweiz AG, Horgen (CH)

(72) Inventors: Andreas Vetter, Pfäffikon (CH);
Maxime Bösiger, Einsiedeln (CH);
Markus Widrig, Benken SG (CH)

(73) Assignee: Oetiker Schweiz AG, Horgen (CH)

( * ) Notice: Subject to any disclaimer, the term of this patent is extended or adjusted under 35 U.S.C. 154(b) by 168 days.

(21) Appl. No.: 17/429,679

(22) PCT Filed: Nov. 27, 2019

(86) PCT No.: PCT/EP2019/082696
§ 371 (c)(1),
(2) Date: Aug. 10, 2021

(87) PCT Pub. No.: WO2020/169223
PCT Pub. Date: Aug. 27, 2020

(65) Prior Publication Data
US 2022/0107040 A1 Apr. 7, 2022

(30) Foreign Application Priority Data
Feb. 22, 2019 (EP) ..................................... 19158911

(51) Int. Cl.
*F16L 33/025* (2006.01)
*F16L 33/035* (2006.01)

(52) U.S. Cl.
CPC ........... *F16L 33/025* (2013.01); *F16L 33/035* (2013.01)

(58) Field of Classification Search
CPC ....... F16L 33/02; F16L 33/025; F16L 33/035; Y10T 24/1412; Y10T 24/1457
See application file for complete search history.

(56) References Cited

U.S. PATENT DOCUMENTS

| 6,598,269 B2 * | 7/2003 | Oetiker ................. F16L 33/035 24/20 R |
| 2004/0134042 A1 | 7/2004 | Craig |

(Continued)

FOREIGN PATENT DOCUMENTS

| EP | 1106895 A1 | 6/2001 |
| EP | 1191270 A1 | 3/2002 |

OTHER PUBLICATIONS

Nternational Search Report Form PCT/ISA/210, and Written Opinion Form PCT/ISA/210, International Application No. PCT/EP2019/082696, pp. 1-9, International Filing Date Nov. 27, 2019.

*Primary Examiner* — Zachary T Dragicevich
(74) *Attorney, Agent, or Firm* — Bond Schoeneck & Klng PLLC; David L. Nocilly

(57) ABSTRACT

A hose clamp having a clamping band (10) with band sections overlapping in the closed state of the hose clamp, on which hooks (12, 19) are arranged for closing the hose clamp, and with a tightening device (15) arranged in the outer band section for tightening the hose clamp around an object to be clamped. The overlapped inner end of the clamping band (10) is formed as a tongue (11) with a reduced width compared to the clamping band (10) and is received by a tongue channel (45) arranged in the outer band section. The tongue (11) is stamped out of the clamping band (10) and has outwardly projecting side flaps (42) and a bottom part (43) which is arranged between them, formed from the clamping band (10) and rises continuously from the clamping band (10) up to the height of the side flaps (42).

8 Claims, 4 Drawing Sheets

(56) References Cited

U.S. PATENT DOCUMENTS

Figure 1:
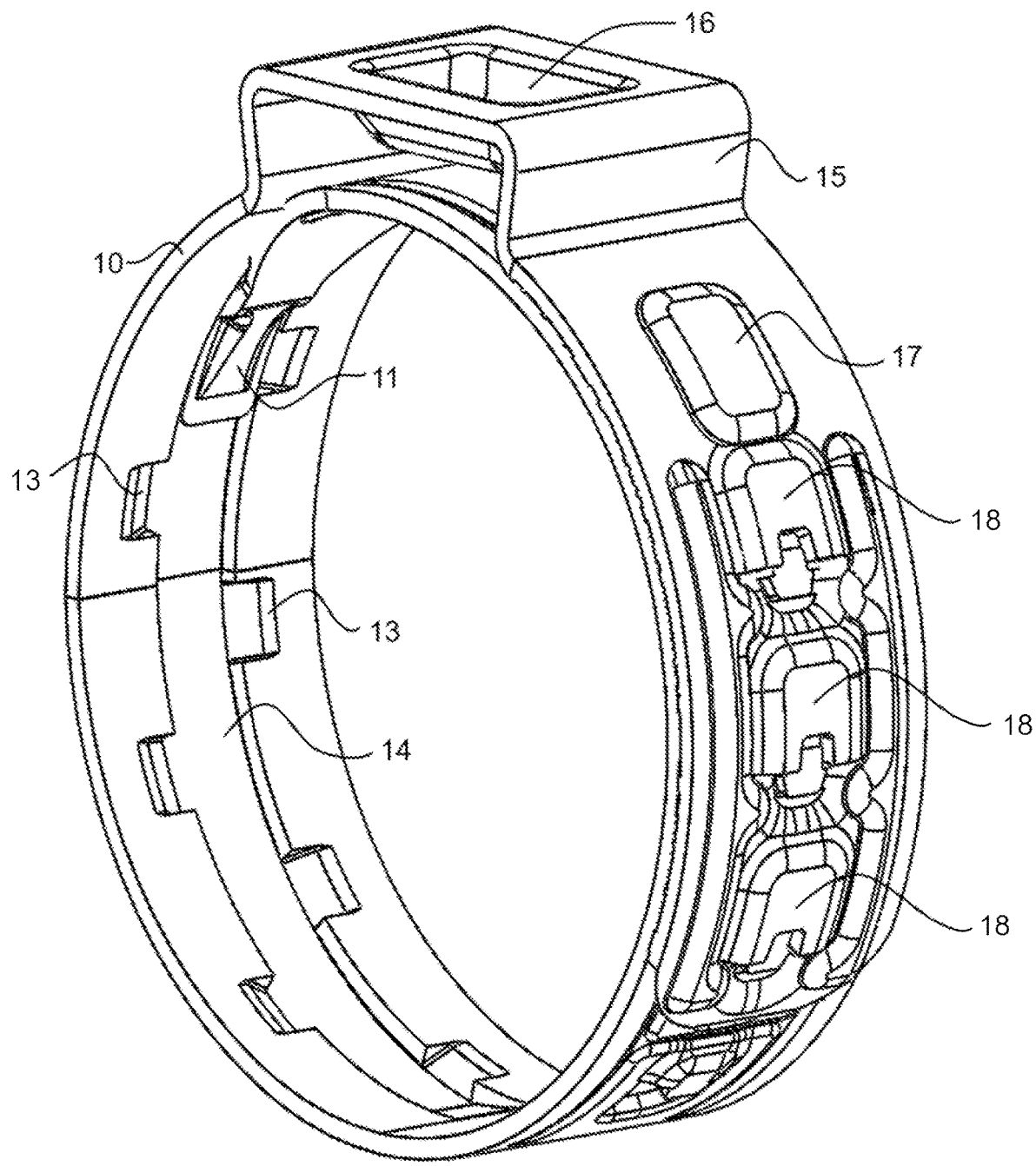

| | | | |
|---|---|---|---|
| 2005/0223526 A1* | 10/2005 | Oetiker | F16L 33/035 24/20 CW |
| 2006/0117534 A1* | 6/2006 | Craig | F16L 33/025 24/20 CW |
| 2009/0172924 A1* | 7/2009 | Ito | F16L 33/035 24/20 CW |
| 2014/0259547 A1* | 9/2014 | Miessmer | F16L 33/035 24/268 |
| 2016/0201834 A1* | 7/2016 | Seelos | F16L 33/025 24/19 |
| 2018/0187808 A1* | 7/2018 | Mueller | F16L 33/035 |

* cited by examiner

HOSE CLAMP

CROSS-REFERENCE TO RELATED APPLICATIONS

The present application is a US national phase of PCT Application No. PCT/EP2019/082696, filed on Nov. 27, 2019, the disclosure of which is incorporated herein by reference in its entirety.

STATE OF THE ART

Hose clamps for connecting a hose to a pipe nipple, for example, are usually designed with a given nominal diameter in such a way that, when tightened, the inner surface of the clamping band is in contact with the hose over its entire circumference without any gaps and a continuous surface pressure is achieved between the hose and the pipe nipple.

A hose clamp is known from WO 2017/005283 A1, in which the outer section of the clamping band has several openings and ear-like tightening means for tightening the hose clamp around the material to be tied and the inner end section has hooks that can be hooked into the openings for closing the hose clamp. Further, a tongue channel is provided in the outer clamp band section for receiving and guiding a tongue provided at the inner end of the clamping band. The tongue channel is formed by a band arch cut out of the clamping band and connected to side parts of the clamping band via connecting flaps.

SUMMARY OF THE INVENTION

The invention is based on the general object of at least partially eliminating disadvantages that occur in comparable hose clamps according to the state of the art. A more specific object of the invention can be seen in the provision of a hose clamp with high strength of the parts connecting the inner and outer band sections in the region of the tongue.

The solution to this problem is achieved with the hose clamp specified in claim 1, consisting of a clamping band with band sections which overlap in the closed state of the hose clamp and on which hooks for closing the hose clamp are arranged, and with tightening means arranged in the outer band section for tightening the hose clamp around an object to be clamped, wherein the overlapped inner end of the clamping band is designed as a tongue with a reduced width compared to the clamping band and the outer band section has a tongue channel for receiving the tongue. In this case, the tongue is stamped out of the clamping band while forming outwardly projecting side flaps and a central bottom part between them, wherein the bottom part formed by the clamping band continuously rises up to the height of the side flaps.

The design of the tongue according to the invention results in a smooth transition between the tongue and the full-bandwidth band section and in a uniform distribution of pressure from the inner to the outer band section.

Preferentially, the tongue channel has a band arch cut out of the clamping band and connected to side parts of the clamping band via connecting flaps, wherein the connecting flaps provided on both sides are offset with respect to each other in the circumferential direction of the hose clamp. This prevents the band arch from collapsing even when the length of the hose clamp is great.

Lateral reinforcement beads can be provided on both sides of the tongue channel or the band arch between the tongue channel and the respective edges of the clamping band in order to improve the stability of the hose clamp in the tongue region.

The cold forming process provides the tongue with high strength; it can therefore be formed into a compact design without compromising its function for aligning (centering) the inner and outer sections of the band.

DRAWINGS

Figure 2:
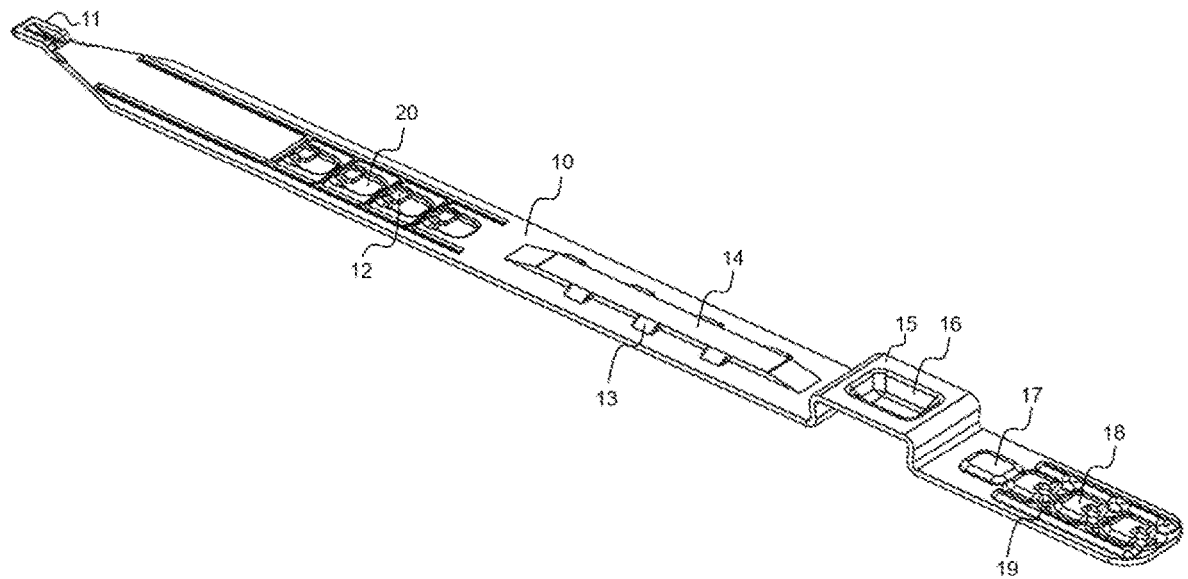
Figure 3:
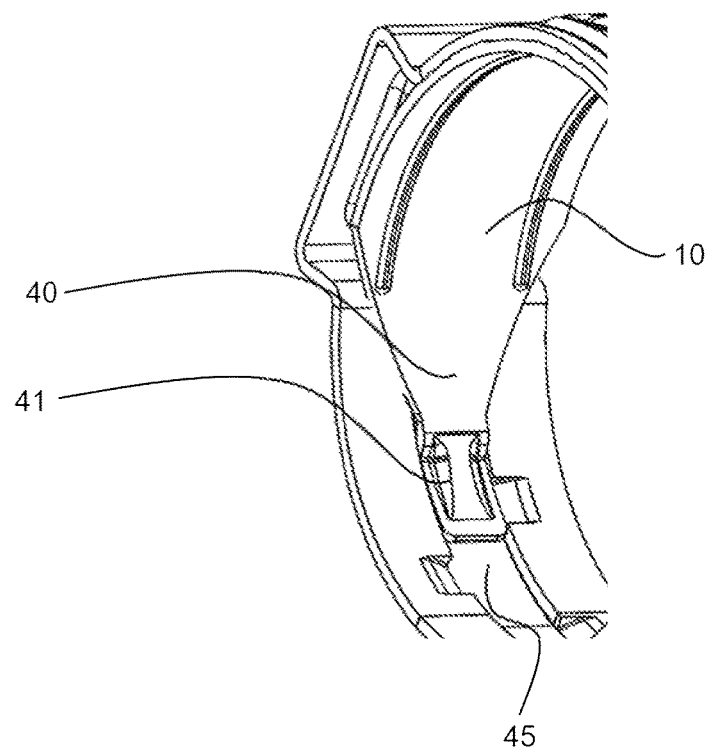
Figure 4:
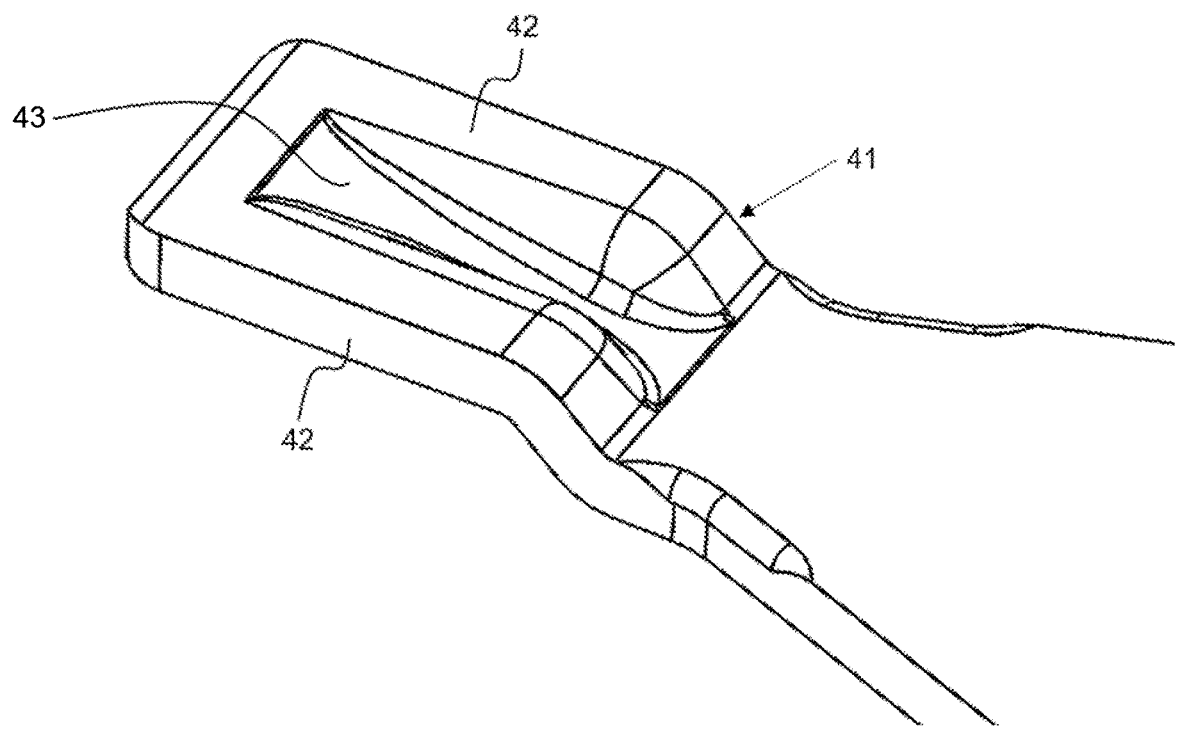
Figure 5:
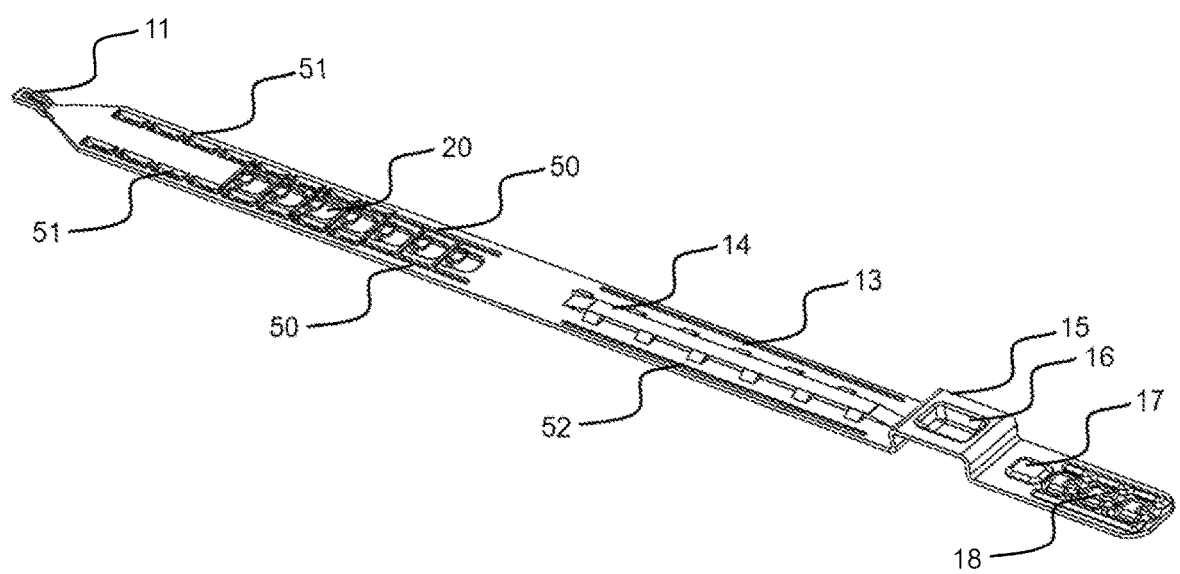
Figure 6:
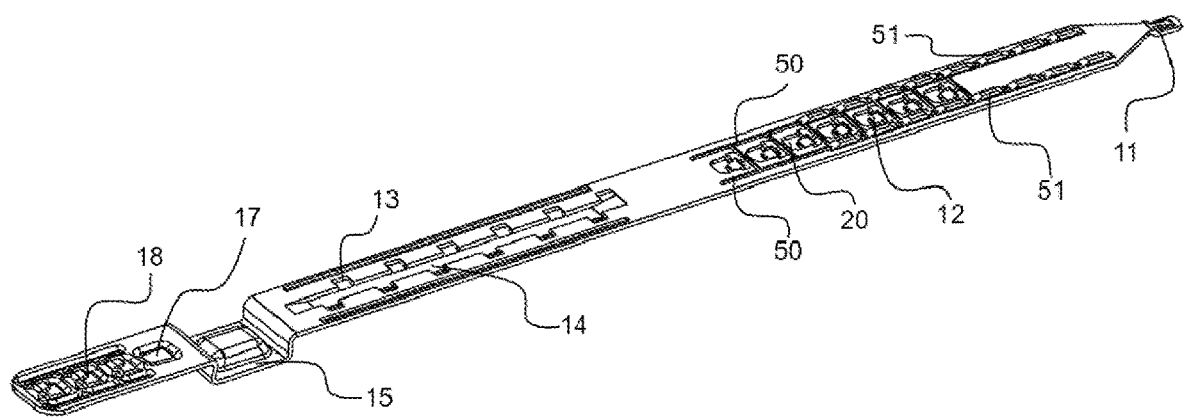
Figure 7:
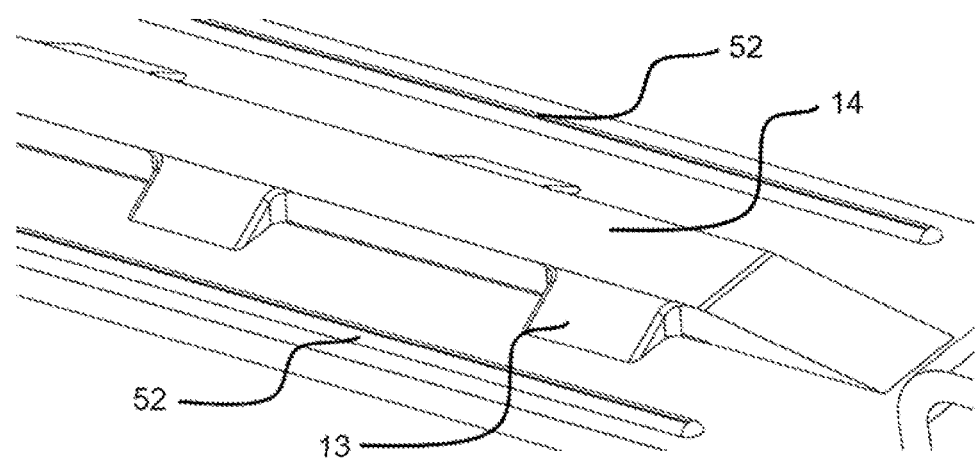

Two embodiments of the invention are explained in more detail below with reference to the drawings. Here:

FIG. 1 shows the hose clamp in the closed state according to an embodiment of the invention, FIG. 2 shows the hose clamp in the stretched state, FIG. 3 shows the tongue engaging in the tongue channel, seen from inside of the closed hose clamp, FIG. 4 shows the radially outer side of the tongue end, FIGS. 5 and 6 show the hose clamp in the stretched initial state according to a further embodiment of the invention, seen from the outer and inner sides in the closed state, respectively, and FIG. 7 shows an enlarged view of the band arch section of the clamping band according to the further embodiment.

EMBODIMENT

The hose clamp shown in FIGS. 1 and 2 consists of an open clamping band 10 which has, starting from the inner clamping band end at the top left in FIG. 2, a tongue 11, a row of positioning hooks, a band arch 14 cut out from the clamping band 10 by two parallel longitudinal cuts and connected to side parts of the clamping band 10 via flaps 13, a tightening device 15 in the form of a so-called "Oetiker" ear with a pair of outwardly cranked legs and a bar connecting them and reinforced by a bead 16, a release hood 17, as well as three tightening hooks 19 with associated opening caps 18 in the other outer band section.

The hose clamp described here is intended in particular for sealing and fastening bellows, e.g. for use in cardan shafts, made of thermoplastic materials or other materials of high Shore hardness which are hard to deform.

In use, the hose clamp which is supplied by the manufacturer in the closed state, is pushed axially onto the material to be tied, such as a pipe nipple and a hose surrounding it, or, alternatively, is opened for radial assembly and placed around the material to be tied, with the tongue 11 coming to rest under the band arch 14. The three tightening hooks 19 are then engaged with the positioning hooks 12 corresponding to the smallest possible diameter of the concerned material to be tied.

Referring to FIGS. 3 and 4, the tongue 11 comprises a trapezoidal transition section 40 in which the width of the clamping band 10 decreases continuously from the full bandwidth to the reduced width of a tongue end section 41.

The tongue end portion 41 is stamped out of the clamping band 10 to form outwardly projecting side flaps 42 and a central bottom portion 43 between them, the bottom portion 43 formed by the clamping band 10 continuously rising up to the height of the side flaps 42.

In the closed state of the hose clamp as attained in FIG. 3, the tongue end section 41 engages in a tongue channel 45 formed by the band arch 14, the height of the side flaps 42 corresponding to the depth of the tongue channel 45.

As shown in FIGS. 1 and 2, the flaps 13 connecting the band arch 14 of the tongue channel 45 with the side parts of the clamping band 10 are offset with respect to each other by half a pitch on both sides in the circumferential direction of the hose clamp. In this way, the band arch 14 is optimally supported against collapse using a small number of flaps 13.

FIGS. 5 to 7 show a further embodiment of the invention in which the section of the clamping band 10 in which the band arch 14 serving as the tongue channel 45 is arranged, is provided with lateral reinforcement beads 52.

This clamp band section is particularly stressed and therefore susceptible to breakage. The reinforcement beads 52, which are preferably channel-shaped over their lengths and arranged on both sides of the tongue channel, are particularly effective for the stabilisation of the hose clamp in this area.

In addition to the reinforcement beads 52 in the band arch section, also reinforcing beads 50, 51 are provided in the further embodiment in the section of the clamping band 10 which, in the closed state of the hose clamp, is arranged underneath the tightening device 15. Depending on the hose diameter, in the closed state of the hose clamp, one or more of the positioning hooks 12 are in engagement with the corresponding number of tightening hooks 19. On the tongue side thereof, a part of the inner end of the band reaches the position underneath the tightening device 15. The lateral corrugated beads 51 provided in the concerned part of the clamping band stabilise the clamping band 10 against buckling in the radial direction underneath the tightening device 15. The corrugation beads 51 can be designed in the form of interrupted grooves or as a series of individual beads. On both sides of the clamping band, they merge into continuous groove-shaped reinforcement beads 50.

In the present embodiment, the reinforcement beads 50, 51, 52 are provided both in the area of the positioning hooks 12 and in the area of the band arch 14 in order to jointly contribute to the overall stability of the hose clamp. However, it is also conceivable to provide only the reinforcement or corrugated beads 50, 51 or only the reinforcement beads 52.

REFERENCE SIGNS

10 clamping band
11 tongue
12 positioning hook
13 flap
14 band arch
15 tightening device
16 bead
17 release hood
18 opening cap
19 tightening hook
20 release window
40 transition section
41 tongue end section
42 side flaps of the tongue 11
43 bottom part of the tongue 11
45 tongue channel reinforcement
50 reinforcement bead
51 corrugated bead
52 reinforcement bead

The invention claimed is:

1. A hose clamp made of a clamping band (10), comprising:
    band sections overlapping each other in the closed state of the hose clamp, on which hooks (12, 19) are arranged for closing the hose clamp, and comprising a tightening device (15) arranged in the outer band section for tightening the hose clamp around an object to be clamped, wherein the overlapped inner end of the clamping band (10) is formed as a tongue (11) with a reduced width compared to the clamping band (10) and the outer band section has a tongue channel (45) for receiving the tongue (11),
    characterised in that the tongue (11) is stamped out of the clamping band (10) while forming outwardly projecting side flaps (42) and a central bottom portion (43) between them, the bottom portion (43) formed by the clamping band (10) continuously rising up to the height of the side flaps (42).

2. The hose clamp according to claim 1, wherein the height of the side flaps (42) of the tongue (11) corresponds to the depth of the tongue channel (45).

3. The hose clamp according to claim 1 or 2, wherein the tongue channel (45) comprises a band arch (14) cut out of the clamping band (10) and connected to side parts of the clamping band (10) via flaps (13).

4. The hose clamp according to claim 3, wherein the flaps (13) provided on both sides are offset with respect to each other in the circumferential direction of the hose clamp.

5. The hose clamp according to claim 3, wherein the flaps (13) provided on both sides are provided opposite to each other in pairs in the circumferential direction of the hose clamp.

6. The hose clamp according to claim 1, wherein reinforcement beads (52) are formed on both sides of the tongue channel (45) between the tongue channel (45) and the respective lateral edges of the clamping band (10).

7. The hose clamp of claim 6, wherein the reinforcement beads (52) each extend along the entire length of the tongue channel (45) or along only a portion thereof.

8. The hose clamp according to claim 6, wherein the reinforcement beads (52) are of formed as continuous grooves.

* * * * *